June 23, 1931.  A. A. RODGERS  1,811,280
COMMUNICATING HELMET
Filed Aug. 17, 1929
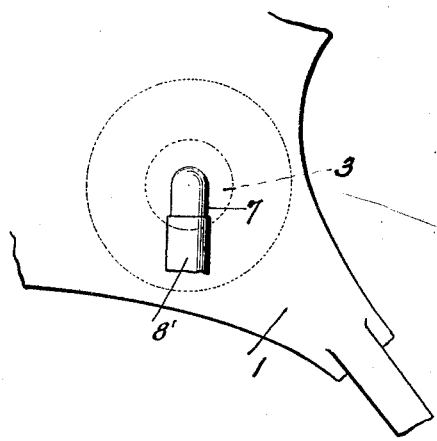
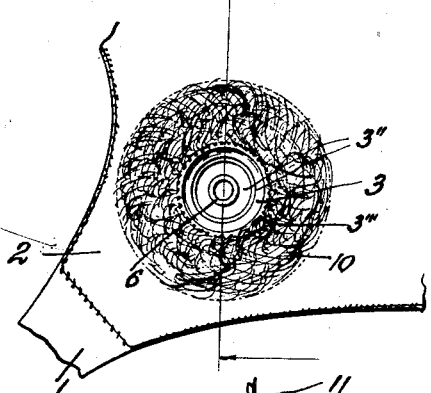
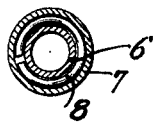
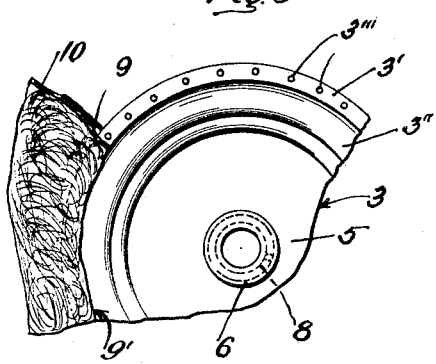
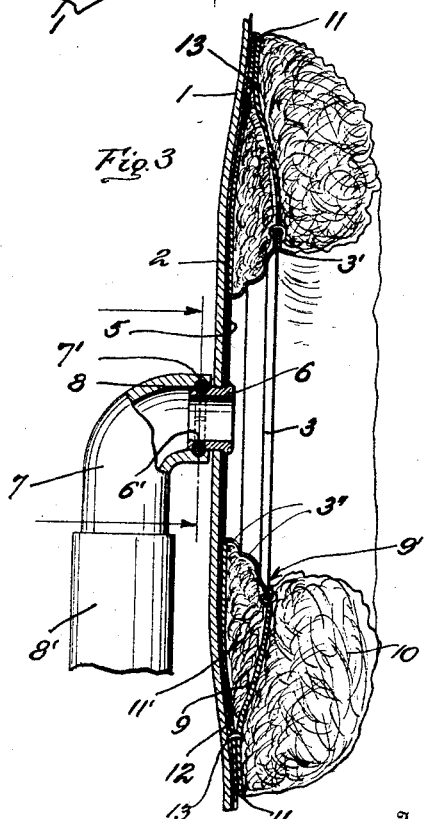
Inventor
Alfred A. Rodgers,
By
Attorney Patented June 23, 1931

1,811,280

UNITED STATES PATENT OFFICE

ALFRED A. RODGERS, OF LOS ANGELES, CALIFORNIA, ASSIGNOR TO SCULLY BROS. INC., OF LOS ANGELES, CALIFORNIA, A CORPORATION OF CALIFORNIA

COMMUNICATING HELMET

Application filed August 17, 1929. Serial No. 386,680.

My invention relates to aviators' helmets and it has particular reference to a helmet adapted for use by students of aviation in receiving instructions in the art of flying. One of the principal annoyances encountered at present by students of aviation is the great difficulty of hearing the words of instruction, regardless of the care with which they are articulated by the instructor. Either the whir of the motor, the rush of winds or other distracting sounds commingle with the voice of the instructor and it is extremely difficult for the student to hear above those noises the spoken words of instruction. Where these noises are successfully excluded from the hearing of the student, perfect understanding and comprehension of the instructional words conveyed through a speaking tube to the ears of the student are rendered difficult because of reverberation which interferes with or destroys the clarity of well articulated speech that then becomes audible to the hearer merely as incomprehensible sounds.

The prime object of the present invention, therefore, is to provide in connection with a helmet or aviators' headgear, a means by which reverberation set up by the voice of the instructor is prevented and a clear audition of his words may be had by the student.

Other objects of the invention are to provide a simple device for use in a helmet, by which the instructor's voice will be amplified, to provide a communicating helmet which will offer the maximum comfort, and to provide a simple device of this character with a readily attachable and detachable speaking tube.

The invention is shown in preferable form in the accompanying drawings which form a part of this specification, and therein Fig. 1 is a fragmentary side view of one of the side pieces of a helmet showing my invention as applied thereto.

Fig. 2 is a fragmentary inside view of one of the side pieces of a helmet showing my invention as applied thereto.

Fig. 3 is an enlarged section on line 2—2 Fig. 2

Fig. 4 is a section on line 4—4 Fig. 3, and

Fig. 5 is a fragmentary enlarged plan view showing the amplifier.

Aviators' helmets comprise top portions and side portions which cover the ears of the wearer and the invention is adapted to be placed inside each of said side portions, one of which is illustrated at 1, in Figs. 1, 2 and 3. In Figs. 2 and 3 the side portion is shown provided with a lining 2, which may or may not enter into the structure of the helmet.

As hereinafter explained, the amplifier shown at 3, constitutes a unit with a pad or section of a pelt which is arranged to be fastened to the lining 2 of the helmet. The amplifier 3 comprises a tapering or cone shaped bowl or shallow cup having at the widest end thereof an annular flat rim 3' and formed with a plurality of annular beads or steps 3''. The substantially flat bottom 5 of the tapering or conical bowl is arranged to be flat against the lining 2, where such lining is used, and is provided with a centrally disposed outwardly projecting tubular member 6, which is arranged to project through an opening in the lining 2 and through the outer covering of the helmet. An elbow 7 is arranged for attachment at one end to said tubular member 6 and to the other end of said elbow is adapted to be fitted or connected a flexible tube 8' through which the voice of the instructor is conveyed. The elbow 7 is provided with an internal annular groove 7' in which is contained a split spring ring 8 of slightly smaller diameter than the groove 7' in which it is contained, and the tubular extension or member 6 is provided with an external annular groove 6' into which the spring ring 8 contracts when the elbow is pressed upon the tubular member and the groove 7' therein registers with the groove 6'. In this wise the elbow is detachably connected to said tubular member 6 and the connection, as explained, constituting a swivel, may swing freely thereon and relatively thereto, preventing thereby any pull on the helmet of the student. The swivel connection is sufficiently snug to exclude extraneous sounds and noises which otherwise might commingle with the instructional words of the teacher and confound an intelligent understanding of them.

The annular flat rim 3' of the cone shaped bowl 3 is provided with perforations 3''', for stitching or sewing the amplifier 3 onto the circular edge which defines an opening or perforation 9' in a piece of pelt 9 containing the natural wool or fleece 10 that extends beyond the flat rim 3' of the amplifier and is arranged to fit snugly against the face of the wearer and around a substantial portion of the ear. The wool or fleece forms a cushion for comfort, and provides a chamber from which all sounds save those transmitted through the speaking tube 8' and amplified by the shallow bowl 3 are excluded. The wool or fleece 10 which when pressed against the ear forms the annular sound chamber, prevents reflection of the sound waves within same, and the beads or ridges 3'' in the amplifier, while tending to increase the conveyed sounds or words enunciated by the instructor, prevent vibration thereof, which otherwise would disturb the clearness of the speech.

To the outer edge of the pelt, pad or cushion 9 and on the outside thereof, is sewed by stitches 11, a piece or section 12 of pelt, the fleece or wool 11' whereof fills the space between the outside of the pelt 9 and the lining 2. This space is created by thickness of the amplifier 3, and if not filled, would produce wrinkles in the outside skin or covering of the helmet. The conjoined pelt sections 9 and 12 are thereupon sewed by stitches 13 onto the lining 2, where used, but where it is omitted, the pelt sections are sewed directly onto the outer covering of the helmet.

It will be noted that the amplifying and clarifying device, which combines with it the pad or cushion that forms an ear encircling sound chamber, is adaptable to any helmet or headgear and when so adapted, will enable the wearer to enjoy perfect audition without strain and with perfect freedom from extraneous distracting noises.

It will be obvious that the amplifying unit may be incorporated in the helmet as a part of the structure thereof or may be applied to any helmet as an adjunctive part thereof, and both adaptations are included in this disclosure.

What I claim is:

1. In combination with an aviator's headgear, a concave sound clarifying and amplifying device, having a sound communicating tubular member, and a pad attached to the edge of said amplifying device and adapted to lie against and encircle the ear of the wearer and to form a non-reverberant sound chamber.

2. In combination with an aviator's headgear, a cushion having an opening therein, a bowl shaped sound amplifying device attached to the edge defining the opening in said cushion, and provided with a tubular extension, and a fitting swiveled on said extension and adapted to be connected with a speaking tube.

3. In combination with an aviator's helmet, a concave sound amplifying body having annular corrugations and a tubular extension penetrating the side of the helmet, and a compressible ear-encircling pad attached to said amplifying body and forming a sound chamber and means for attaching said pad to the side of the helmet.

4. In combination with an aviator's helmet, a cone shaped body having annular beads, and a rim, said body provided with a tubular extension arranged to penetrate the side of the helmet, and an ear encircling, non-reverberant sound chamber fastened to the rim of said cone shaped body, and means for attaching said sound chamber to the helmet.

5. In combination with an aviator's helmet, a non-resonant sound amplifying conical body provided with a tubular sound communicating member arranged to penetrate the side of the helmet, a speaking tube swiveled on said member, an ear-encircling cushion having an opening therein communicating with said conical body and arranged to lie snugly against the ear of the wearer to form a non-reverberant sound chamber, and means for attaching said cushion to said conical body.

6. In combination with an aviator's headgear, a cushion having an opening therein, concave sound amplifying device attached to the edge of said opening in said cushion, said device formed with corrugations to clarify vocal tones, and swiveling means for conveying sound to said device.

In testimony whereof I have set my hand.
ALFRED A. RODGERS.